(12) United States Patent
Suda et al.

(10) Patent No.: US 8,456,058 B2
(45) Date of Patent: Jun. 4, 2013

(54) ACTUATOR

(75) Inventors: Sakae Suda, Yokohama (JP); Sotomitsu Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 12/858,292

(22) Filed: Aug. 17, 2010

(65) Prior Publication Data

US 2011/0050048 A1  Mar. 3, 2011

(30) Foreign Application Priority Data

Aug. 27, 2009 (JP) ................................. 2009-197414

(51) Int. Cl.
  *H02N 11/00* (2006.01)
(52) U.S. Cl.
  USPC ........................................................ 310/300
(58) Field of Classification Search
  USPC ........................................ 310/300, 301, 305
  See application file for complete search history.

(56) References Cited

U.S. PATENT DOCUMENTS

| | | | | |
|---|---|---|---|---|
| 2,768,313 A | * | 10/1956 | Rappaport | 310/305 |
| 3,078,403 A | * | 2/1963 | Wolcott | 318/116 |
| 2006/0266981 A1 | | 11/2006 | Asaka et al. | |
| 2009/0308737 A1 | * | 12/2009 | Kudoh | 204/242 |
| 2010/0039001 A1 | * | 2/2010 | Kudoh | 310/366 |
| 2010/0055378 A1 | * | 3/2010 | Kim et al. | 428/68 |
| 2010/0164330 A1 | * | 7/2010 | Komatsu et al. | 310/365 |
| 2011/0156530 A1 | * | 6/2011 | Yamamoto et al. | 310/300 |
| 2011/0156538 A1 | * | 6/2011 | Ono et al. | 310/363 |

FOREIGN PATENT DOCUMENTS

| | | | |
|---|---|---|---|
| JP | 59023260 A | * | 2/1984 |
| JP | 4038685 B | | 1/2008 |

* cited by examiner

*Primary Examiner* — Thomas Dougherty
(74) *Attorney, Agent, or Firm* — Canon U.S.A., Inc., IP Division (57) ABSTRACT

The present invention provides an actuator which can obtain a large displacement in a moving part, and suppresses the deterioration due to a counteracting force of the moving part in a stationary part. The actuator has a pair of electrode layers which contain a conductive material and a polymer, and an ionic conduction layer which is sandwiched between the pair of the electrode layers, wherein the content of the conductive material contained in the electrode layer is larger in the stationary part of the actuator than in the moving part of the actuator. The content of the conductive material contained in the electrode layer increases toward the stationary part of the actuator from the moving part.

11 Claims, 4 Drawing Sheets

ACTUATOR

BACKGROUND OF THE INVENTION

1. Field of the Invention

The present invention relates to an actuator.

2. Description of the Related Art

In recent years, an actuator has been proposed which can be easily miniaturized, has quick responsiveness and operates at a thrifty electric power. For instance, Japanese Patent No. 4038685 proposes an ion-conductive polymer actuator which bends and deforms in the air and in a vacuum at such a low voltage as not more than several V, by using a carbon nanotube and an ionic liquid which is nonvolatile.

SUMMARY OF THE INVENTION

When the above described actuator is used in a device such as a robot and a micromachine, at least one part of the actuator is fixed as a stationary part, and a site at which the actuator deforms largely, in other words, a position apart from the stationary part is driven as a moving part. Then, the actuator can exert a large deformation action due to the moving part of the actuator on the device. However, when the actuator is continuously and repeatedly driven, the actuator occasionally causes a crack, a crease and the like in the vicinity of the stationary part. This is considered to be because a larger counteracting force is applied to the vicinity of the stationary part compared to the moving part, and the solution is requested. In other words, it is particularly necessary for the actuator in which a large displacement is obtained in the moving part to enhance the durability of the stationary part, and it is required to enhance a generating force in the vicinity of the stationary part.

The present invention is designed with respect to the above described problem, and is directed at providing an actuator which can obtain a large displacement in a moving part, and suppresses the deterioration due to a counteracting force of the moving part in the stationary part.

An actuator for solving the above described problem comprises a pair of electrode layers which contain a conductive material, and an ionic conduction layer which is sandwiched between the above described pair of the electrode layers, wherein a content of the conductive material contained in the electrode layer is larger in the stationary part of the actuator than that in the moving part of the actuator.

The present invention can provide an actuator which can obtain a large displacement in the moving part, and suppresses the deterioration due to the counteracting force of the moving part in the stationary part.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(Drive Principle of Actuator)

Figure 6A:
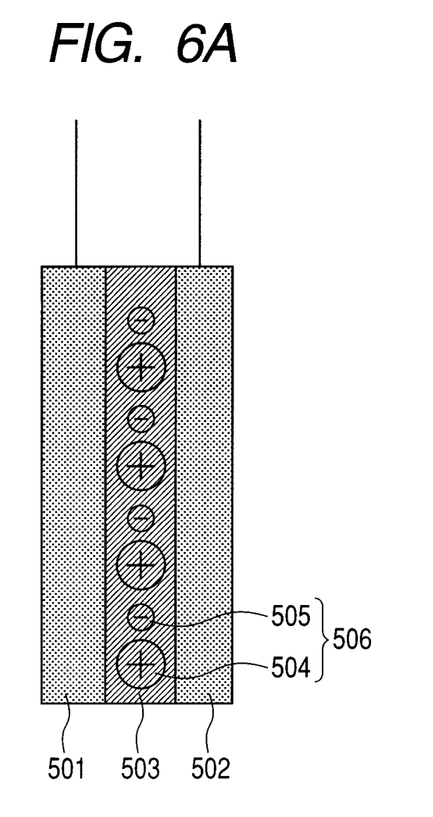
FIGS. 6A and 6B are views illustrating a drive principle of an actuator in which an ionic conduction layer is sandwiched between a pair of electrode layers.

Firstly, the drive principle of an actuator will be described below. The drive principle of the actuator of the present invention including a structure in which a pair of electrode layers sandwiches an ionic conduction layer is not clear yet, but the principle which is assumed at present will be described below with reference to FIGS. 6A and 6B. As is illustrated in FIG. 6A, a pair of electrode layer 501 and electrode layer 502 is formed on surfaces of an ionic conduction layer 503 in a state of being mutually insulated.

Figure 6B:
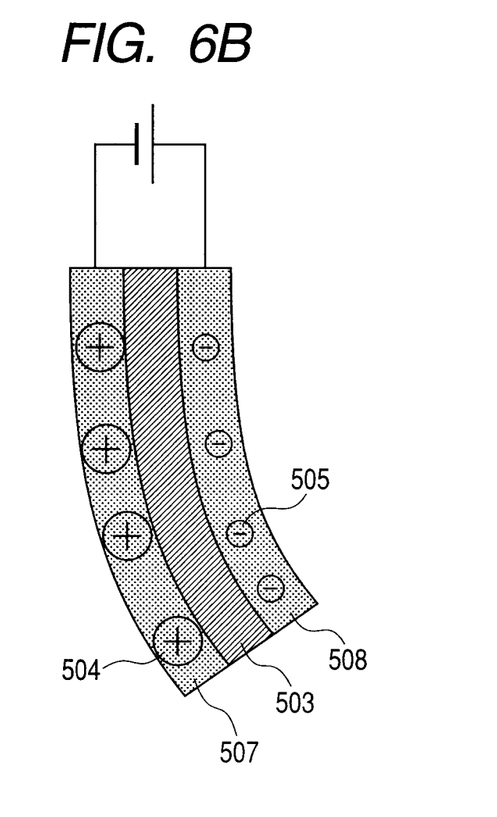

When a potential difference is applied between the electrode layer 501 and the electrode layer 502, as is illustrated in FIG. 6B, for the cations 504 and anions 505 of an ionic material 506, the cations 504 transfer/permeate to an electrode layer 507 of a cathode and the anions 505 transfer/permeate to an electrode layer 508 of an anode, respectively. Then, an electric double layer is formed in the interface between a conductive material phase and an ionic material phase in the electrode layers 507 and 508. In the ionic liquid which can be used advantageously, the ion radius of the cation 504 is larger than that of the anion 505. It is considered that the electrode layer 507 consequently further expands compared to the electrode layer 508 due to a cooperative action of a steric effect of the ions existing in the electrode layers and an electrostatic repulsion originating in the electric double layer, and that the actuator bends in a direction in which the electrode layer 507 of the cathode further extends compared to the electrode layer 508 of the anode. The direction of bending deformation, the displacement, the displacement speed and the like vary depending on types of the electrode layer/ionic conduction layer, a composition/constitution of the electrode, types of transferring ions and the like. When the polarity of the potential is reversed, a film usually bends and deforms to an opposite direction.

First Embodiment

An Actuator in which a Content of a Conductive Material Contained in an Electrode Layer is Larger in a Stationary Part of the Actuator than in a Moving Part of the Actuator The first embodiment of the present invention is an actuator comprising a pair of electrode layers which contain a conductive material, and an ionic conduction layer which is sandwiched between the pair of the electrode layers, wherein a content of the conductive material contained in the electrode layer is larger in a stationary part of the actuator than in a moving part of the actuator.

The actuator of the present invention comprises the pair of the electrode layers which contain at least the conductive material and the ionic material sandwiching an ionic conduction layer which contains at least the ionic material, and is bent when voltage is applied between the electrode layers. A drive principle of an actuator in the above described actuators will be described below with reference to FIG. 1A, in which the content of the conductive material contained in the above described electrode layer in the cross section of the above described electrode layer in a direction perpendicular to the longitudinal direction from the moving part of the actuator to the stationary part increases step by step or continuously in a direction from the moving part to the stationary part.

Figure 1A:
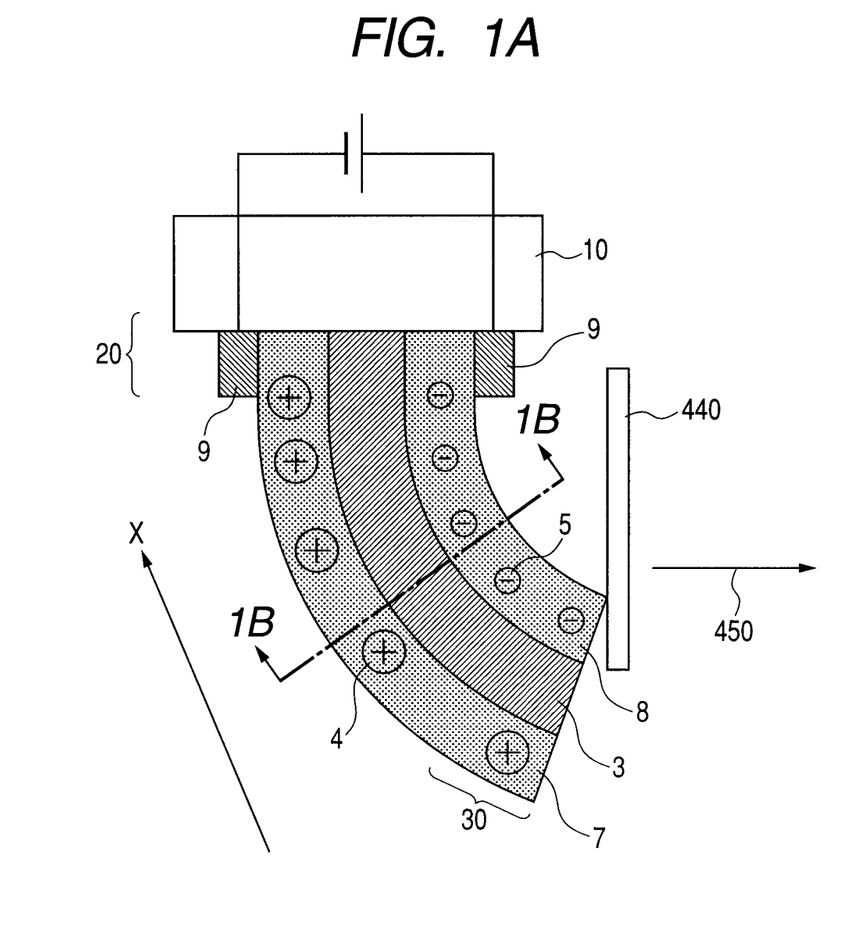
FIGS. 1A and 1B are schematic views illustrating one embodiment of an actuator of the present invention.

When the actuator is used in a device such as a robot and a micromachine, the actuator needs to fix at least one part of the actuator and exert an action on the device. In FIG. 1A, the stationary part 20 of the actuator is fixed to one part 10 of the device by a fixing tool 9 provided with electrodes. The fixing tool 9 may be a fixing tool provided with the electrodes for applying voltage to the actuator, or the electrodes may exist separately.

The moving part 30 is a part of the actuator which exerts an action on the device, and the moving part shall be a site at which the actuator largely deforms, in other words, a position distant from the stationary part. Thereby, the actuator can exert a greater action on the device. The moving part 30 according to the present invention is a tip part in an opposite direction to the stationary part 20. The direction from the moving part 30 to the stationary part 20 in the present invention is an X direction in FIG. 1A.

In addition, the cross section of the above described electrode layer in a direction perpendicular to the longitudinal direction from the moving part to the stationary part in the actuator of the present invention is a cross section 1B-1B, for instance, in FIG. 1A. In the above described cross section, the pair of the electrode layers sandwiches the ionic conduction layer. In the cross section 1B-1B, for instance, the electrode layer 7 of a cathode and the electrode layer 8 of an anode sandwich the ionic conduction layer 3.

In FIG. 1A, when a potential difference is applied between the pair of the electrode layer 7 and the electrode layer 8, for the cations 4 and anions 5 of an ionic material, the cations 4 transfer/permeate to the electrode layer 7 of the cathode and the anions 5 transfer/permeate to the electrode layer 8 of the anode, respectively. Then, an electric double layer is formed in the interface between a conductive material phase and an ionic material phase in the electrode layers 7 and 8. In the ionic liquid which can be used advantageously, the ion radius of the cation 4 is larger than that of the anion 5. It is considered that the electrode layer 7 consequently further expands compared to the electrode layer 8 due to a cooperative action of a steric effect of the ions existing in the electrode layers and an electrostatic repulsion originating in the electric double layer, and that the actuator bends in such a direction that the cathode further extends compared to the anode.

In the present invention, the content A of the above described conductive material means the content of the conductive material in the electrode layer in the above described cross section. For instance, in the cross section 1B-1B, the content A means a content of the conductive material contained in the electrode layer 7 and the electrode layer 8.

Figure 1B:
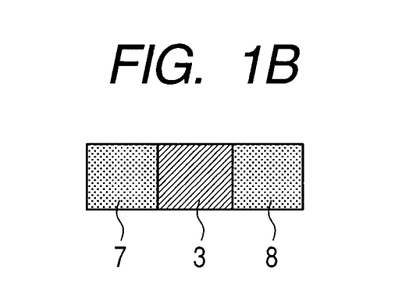

The drive principle of the actuator of the present invention was described in the above with reference to FIGS. 1A and 1B, but is not limited to the above description in particular. The actuator may bending-move by a more largely expanding of one electrode layer out of the pair of the electrode layers than that of the other electrode layer due to the transfer of the ionic material. In addition, the direction of bending deformation, the displacement, the displacement speed and the like vary depending on types of the electrode layer/ionic conduction layer, a composition/constitution of the electrode, types of transferring ions and the like. When the polarity of the potential is reversed, a film usually bends and deforms to an opposite direction.

Figure 2:
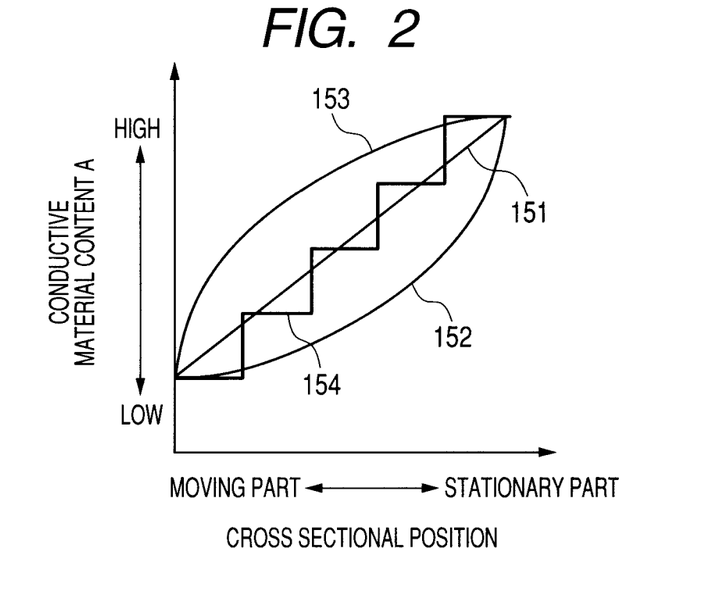
FIG. 2 is a figure illustrating a relationship between a position in an electrode layer in a direction from a moving part to a stationary part and a content of a conductive material, in an actuator of the present invention.

In the present invention, the content of the conductive material contained in the electrode layer can increases step by step or continuously in a direction from the moving part to the stationary part. For instance, the content A of the conductive material can increase step by step in the direction from the moving part to the stationary part, as is illustrated in a relational line 154 between the cross sectional position and the content A of the conductive material in FIG. 2, or the content A of the conductive material can continuously increase in the direction from the moving part to the stationary part as is illustrated in relational lines 151, 152 and 153. Here, the content of the conductive material contained in the electrode layer may increase in the direction from the moving part to the stationary part, and the increasing rate, the number of the increasing steps and the like are not limited in particular.

Because the content of the conductive material contained in the electrode layer increases step by step or continuously in the direction from the moving part to the stationary part, the amount of the ions which transfer/adsorb to the vicinity of the stationary part and exist there increases, the electrode layer more largely expands, and a greater generating force can be obtained in the vicinity of the stationary part. As a result, the durability against crack/deterioration and the like in the vicinity of the stationary part are greatly enhanced, which are caused by a counteracting force applied from the moving part. In addition, because the content of the conductive material contained in the electrode layer increases step by step or continuously in the direction from the moving part to the stationary part, the electrode layer in the vicinity of the moving part becomes flexible and the rigidity of the electrode layer becomes low. As a result, the actuator can provide large displacement in the vicinity of the moving part.

The method of calculating the content of the above described conductive material is not limited in particular, but includes, for instance, the following calculation methods. The content can be measured specifically by a method of calculating the content from the concentration of a conductive material in each position of the direction from the moving part to the stationary part, at the time when the electrode layer has been produced; or a method of observing an arbitrary place in the cross section in a direction perpendicular to the direction from the moving part to the stationary part with a scanning electron microscope, and calculating an area ratio of the conductive material to the other regions through binarization for a measured image and the like by image processing.

Second Embodiment

An Actuator in which the Thickness of an Electrode Layer is Larger in a Stationary Part of the Actuator than in a Moving Part of the Actuator The second embodiment of the present invention is an actuator comprising a pair of electrode layers which contain a conductive material and an ionic conduction layer which is sandwiched between the pair of the electrode layers, wherein the thickness of the electrode layer is larger in a stationary part of the actuator than in a moving part of the actuator. Specifically, in the present invention, the thickness of the above described electrode layer in at least the pair of the electrode layers which sandwich the above described ionic conduction layer can increases step by step or continuously in the direction from the moving part to the stationary part.

Figure 3A:
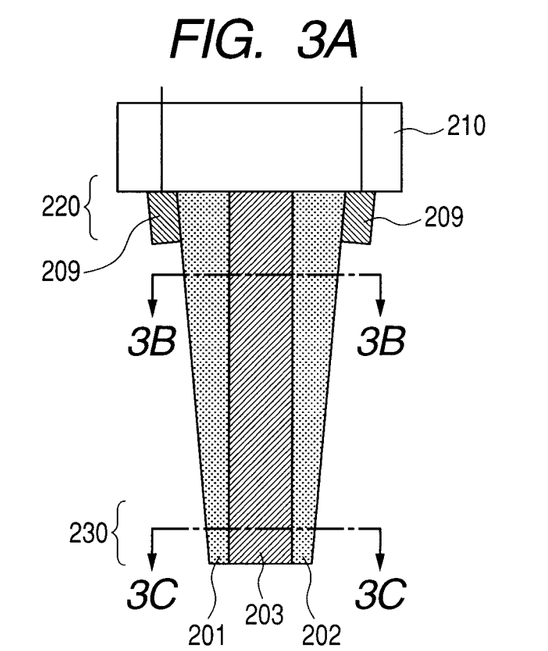
FIGS. 3A, 3B and 3C are schematic views illustrating a structure in which the thickness of an electrode layer of an actuator of the present invention increases in a direction from a moving part to a stationary part.
Figure 3B:
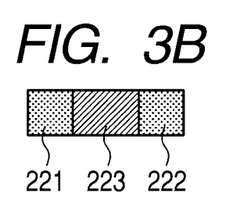
Figure 3C:
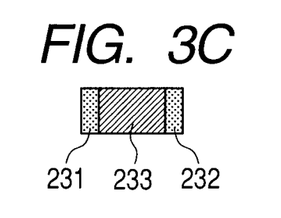

The actuator will be described below with reference to FIGS. 3A, 3B and 3C, in which the thickness of the above described electrode layer increases step by step or continuously in the direction from the moving part to the stationary part. FIG. 3A illustrates a schematic view illustrating a structure in which the thickness of the electrode layer in the present invention increases step by step or continuously in the direction from the moving part to the stationary part, FIG. 3B illustrates a sectional view in the cross section 3B-3B in FIG. 3A, and FIG. 3C illustrates a sectional view in the cross section 3C-3C in FIG. 3A.

In FIG. 3A, a stationary part 220 of the actuator is fixed to one part 210 of the device by a fixing tool 209 provided with an electrode. The moving part 230 of the actuator according to the present invention is a tip part in an opposite direction to the stationary part 220. The cross section of the above described electrode layer in a direction perpendicular to the direction to the stationary part in the present invention means a cross section in a direction perpendicular to the direction from the moving part 230 to the stationary part 220 in FIG. 3A, means a cross section 3B-3B when the cross section is in the vicinity of the stationary part 220, and means a cross section 3C-3C when the cross section is in the vicinity of the moving part 230. In the above described cross section, the pair of the electrode layers sandwiches the ionic conduction layer. For instance, as is illustrated in FIG. 3B, in the cross section 3B-3B in the vicinity of the stationary part, the electrode layer 221 and the electrode layer 222 sandwich the ionic conduction layer 223. As is illustrated in FIG. 3C, in the cross section 3C-3C of the moving part, the electrode layer 231 and the electrode layer 232 sandwich the ionic conduction layer 233.

Figure 4:
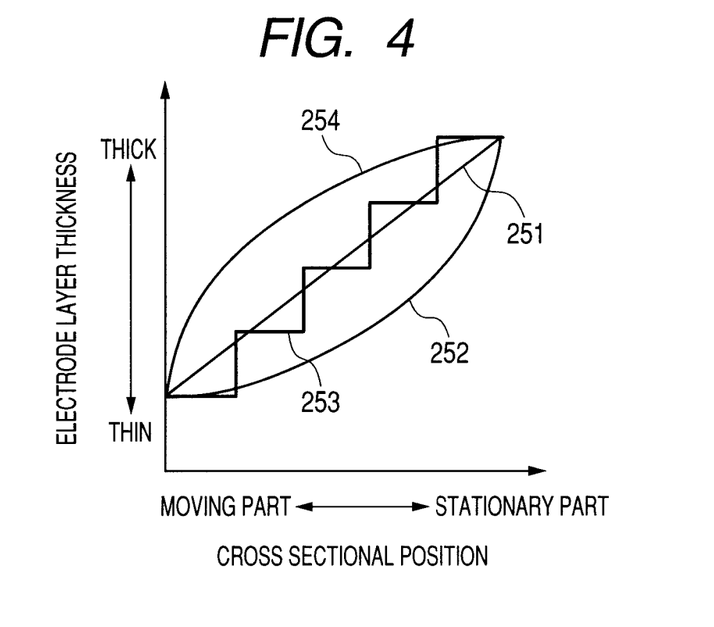
FIG. 4 is a view illustrating a relationship between a position in a direction from a moving part to a stationary part and the thickness of an electrode layer, in an actuator of the present invention.

In the present invention, the thickness of the above described electrode layer can increases step by step or continuously in a direction from the moving part to the stationary part of the actuator. For instance, the thickness of the electrode layer increases step by step in the direction from the moving part to the stationary part, as is illustrated in a relational line 253 between the position and the thickness of the electrode layer in FIG. 4, or continuously increases in the direction from the moving part to the stationary part, as is illustrated in relational lines 251, 252 and 254. Here, the thickness of the above described electrode layer may increase in the direction from the moving part to the stationary part, and the increasing rate, the number of the increasing steps and the like are not limited in particular.

Because the thickness of the electrode layer increases step by step or continuously in the direction from the moving part to the stationary part, the thickness of the electrode layer in the vicinity of the moving part decreases, and the rigidity of the electrode layer becomes low. As a result, the displacement in the vicinity of the moving part becomes larger compared to that of the stationary part. On the other hand, because the thickness of the electrode layer is thick in the vicinity of the stationary part, the amount of the ions which transfer/adsorb to the vicinity of the stationary part and exist there increases, the electrode layer more largely expands, and a greater generating force can be obtained in the vicinity of the stationary part. As a result, the durability against crack/deterioration and the like in the vicinity of the stationary part are greatly enhanced, which are caused by a counteracting force applied from the moving part. The method of calculating the thickness of the above described electrode layer is not limited in particular, but includes, for instance, the following calculation method. The thickness can be measured specifically by a method of observing an arbitrary location in the cross section in a direction perpendicular to the direction from the moving part to the stationary part with a scanning electron microscope, and measuring the thickness.

Third Embodiment

An Actuator in which the Void Fraction of an Electrode Layer is Smaller in a Stationary Part of the Actuator than in a Moving Part of the Actuator The third embodiment of the present invention is an actuator comprising a pair of electrode layers which contain a conductive material and an ionic conduction layer which is sandwiched between the pair of the electrode layers, wherein the void fraction of the electrode layer is smaller in a stationary part of the actuator than in a moving part of the actuator.

Specifically, in the present invention, the void fraction of the above described electrode layer in at least a pair of the electrode layers which sandwich the above described ionic conduction layer can decreases step by step or continuously in the direction from the moving part to the stationary part.

The void fraction according to the present invention means a region in which cations and anions of an ionic material can transfer/exist in the electrode layer, and is proportional to a ratio of volume occupied by the others except for the ionic material and the conductive material in the electrode layer before a potential difference is applied between the electrode layers. In other words, the void fraction according to the present invention is a ratio which is obtained by dividing a volume occupied by the others except for the ionic material and the conductive material in the electrode layer by a volume geometrically calculated from the cross-sectional area and length of the electrode layer, and is expressed by percentage (unit: vol %). The volume occupied by the others except for the conductive material and the ionic material in the electrode layer includes, for instance, a volume of a polymer, or may be a space such as air/gas and vacuum.

The volume of the polymer can be calculated by using the density and the weight of the polymer which has been used when the electrode layer has been produced. The volume occupied by the space such as air/gas and vacuum can be obtained by measuring the produced electrode layer with gaseous adsorption technique, mercury intrusion technique, Archimedes technique and the like.

Figure 5:
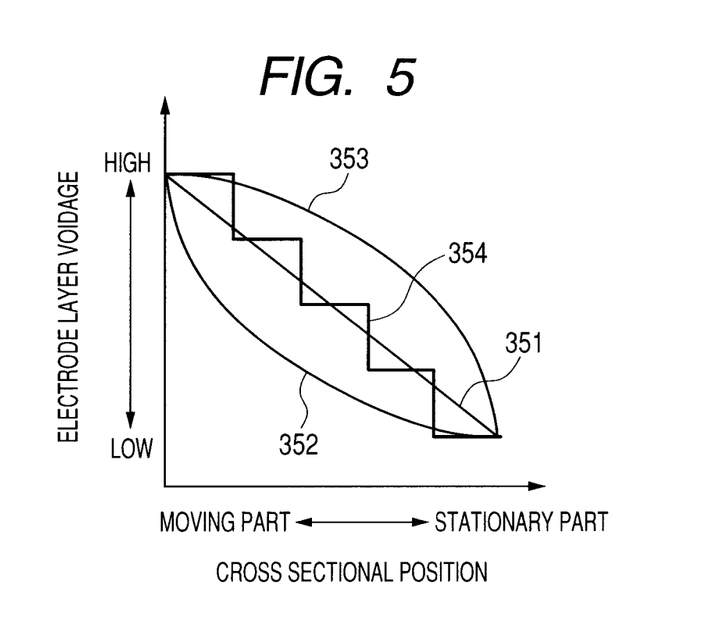
FIG. 5 is a view illustrating a relationship between a position in a direction from a moving part to a stationary part and void fraction in an electrode layer, in an actuator.

In the present invention, the void fraction of the above described electrode layer can decreases step by step or continuously in the direction from the moving part to the stationary part. For instance, the void fraction of the electrode layer can decrease step by step in the direction from the moving part to the stationary part, as is illustrated in a relational line 354 showing a relationship between the position and the void fraction of the electrode layer in FIG. 5, or can continuously decrease in the direction from the moving part to the stationary part, as is illustrated in relational lines 351, 352 and 353. Here, the void fraction of the above described electrode layer may decrease in the direction from the moving part to the stationary part, and the decreasing rate, the number of the decreasing steps and the like are not limited in particular.

Because the void fraction of the above described electrode layer decreases step by step or continuously in the direction from the moving part to the stationary part, the rate of the polymer and the space of air/gas and vacuum in the electrode layer in the vicinity of the moving part increases, and the rigidity of the electrode layer becomes low. As a result, the displacement in the vicinity of the moving part increases compared to that of the stationary part. On the other hand, because the void fraction is small and the ratios of the conductive material and the ionic material are large in the vicinity of the stationary part, the amount of the ions which transfer/adsorb to the vicinity of the stationary part and exist there increases, the electrode layer more largely expands, and a greater generating force can be obtained in the vicinity of the stationary part. As a result, the durability against crack/deterioration and the like in the vicinity of the stationary part are greatly enhanced, which are caused by a counteracting force applied from the moving part.

The method of calculating the void fraction of the above described electrode layer is not limited in particular, but includes, for instance, the following calculation method. In other words, the void fraction (unit: vol %) is calculated by measuring each of a volume (m) of the electrode layer obtained from the cross-sectional area and the length of the obtained electrode layer, and of a volume (n) obtained by subtracting the volume of the ionic material and the conductive material in the electrode layer from the volume (m) of the electrode layer, and calculating the measured values by using the following formula (1).

$$\text{Void fraction} = n/m \times 100 (\%) \quad (1)$$

(Material of Actuator)

Next, a material for the actuator which is used in the present invention will be described below. The actuator of the present invention includes a pair of electrode layers and an ionic conduction layer. The electrode layer contains the conductive material and the ionic material. The ionic conduction layer contains the ionic material.

The ionic material which is used for the present invention can include, for instance, lithium fluoride, lithium bromide, sodium bromide, magnesium chloride, copper sulfate, sodium acetate, sodium oleate and the like. The ionic material which is used for the present invention can be an ionic liquid.

The ionic liquid which is used for the present invention is also referred to as an ambient temperature molten salt and a molten salt, and means a salt which presents with molten state in a wide temperature region including ambient temperature (room temperature). Because the ionic liquid presents with nonvolatility at ambient temperature, when the ionic liquid is used as an ionic conduction material in the present invention, the actuator can be driven in the air of which the humidity is not high and in the vacuum.

In the present invention, various conventionally-known ionic liquids can be used, but the ionic liquid can present with liquid state at ambient temperature (room temperature) or at a temperature close to ambient temperature as much as possible, and stable. In the present invention, the ionic liquid can be an ambient temperature molten salt, and can have an electroconductivity of not less than $0.1\ \text{Sm}^{-1}$. Compounds including any of cations which are expressed by the following general formulae (2) to (5) (and can be imidazolium ion) and an anion ($X^-$) can be illustrated as the ionic liquid which can be used in the present invention.

(2)

(3)

$[NRxH4\text{-}x]^+$ (4)

$[PRxH4\text{-}x]^+$ (5)

In the above described formulae (2) to (5), R indicates an alkyl group having 1 to 12 carbon atoms or an alkyl group which contains an ether bond and has 3 to 12 in the total number of carbon atoms and oxygen atoms. In formula (2), $R_1$ indicates an alkyl group having 1 to 4 carbon atoms or a hydrogen atom. In formula (2), R and $R_1$ can be not the same. In each of formulae (4) and (5), x is an integer of 1 to 4.

The anion ($X^-$) can include at least one selected from tetrafluoroborate anion, hexafluorophosphate anion, bis(trifluoromethane sulfonyl) imidate anion, perchlorate anion, tris (trifluoromethane sulfonyl) carbonate anion, trifluoromethane sulfonate anion, dicyanamidee anion, trifluoroacetate anion, organic carboxylate anion and halogen ion.

The conductive material which is used in the present invention may present with electroconductivity so that the ion permeates/transfers into the electrode layer when voltage is applied between a pair of electrode layers, and includes carbon material, conductive polymer, metal and metal compound. These conductive materials may be used solely or in combination with other one or more types.

In the electrode layer of the present invention, the above described conductive material can be carbon material or conductive polymer from the viewpoint of an interaction with the ionic material. When the conductive material presents with a high interaction with the ionic material, the conductive material can be adequately and uniformly dispersed in the electrode layer, and the mechanical strength of the obtained electrode layer can increase. The carbon material which can be used includes carbon nanotube, carbon black, fullerene, graphite, carbon fiber and the like, but is not limited to these materials. The carbon material may be used solely and also in combination with other one or more types.

The conductive material can be carbon nanotube because a layer having electroconductivity and expansion and contraction properties can be obtained. A conductive gel having expansion and contraction properties can be obtained by shearing and dispersing carbon nanotube together with the ionic liquid. Carbon nanotube is a carbon-based material having such a shape that graphene sheet is wound in a cylindrical shape, is roughly classified into a monolayer nanotube (SWNT) and a multilayer nanotube (MWNT) from the number of layers constituting the circumferential wall, and is also classified into various types such as chiral (spiral) type, zigzag type and armchair type from difference among the structures of the graphene sheet, which are well-known. In the present invention, any type of carbon nanotubes can be used as long as the carbon nanotubes are referred to as a so-called carbon nanotube. Generally, an SWNT which has a large aspect ratio, in other words, which is thin and long, tends to easily form the gel. Accordingly, in the present invention, a gel composition can be obtained from the SWNT. Examples of a practically available carbon nanotube include HiPco (Carbon Nanotechnologies Inc.) which employs carbon monoxide as a raw material and can be comparatively mass-produced, but are not limited to HiPco.

A conductive polymer having electroconductivity can also be used as the conductive material. The conductive polymers include, for instance, a π-conjugated conductive polymer such as polyacetylene, polyaniline, polypyrrole, polythiophene, polyparaphenylene, polyphenylene vinylene and polyazulene, and derivatives of these π-conjugated conductive polymers, but are not limited to these conductive polymers. The conductive polymers may be used solely or in combination with other one or more types.

The electrode layer which is used for the present invention can contain the conductive material and the ionic liquid. In addition, in order to keep a mechanical strength of the electrode layer, the conductive layer may contain a polymer in addition to the carbon nanotube and the ionic liquid.

The content of the conductive material contained in the electrode layer which is used in the present invention can be not less than 1 wt % by percentage with respect to the weight of the electrode layer. When the content is less than 1 wt %, the electrode layer does not provide sufficient electroconductivity occasionally.

The content of the polymer in the electrode layer of the present invention can be not more than 99 wt %. When the content is more than 99%, the electrode layer does not provide sufficient electroconductivity occasionally. The content of the ionic liquid in the electrode layer of the present invention can be not more than 80 wt %. When the content is more than 80 wt %, the electrode layer occasionally presents with a weak mechanical strength.

In the present invention, a polymer which can be used for obtaining the electrode layer is not limited in particular as long as the polymer binder has such flexibility as to be capable of deforming with the bending deformation of the above described actuator, but can have little hydrolyzability and can be stable in the air. Such polymer binders include: a polyolefin-based polymer; polystyrene; polyimide; polyarylenes; a compound in which a sulfonic group, a carboxyl group, a phosphate group, a sulfonium group, an ammonium group, a pyridinium group and the like are introduced into these polymers; a fluorine-containing polymer such as polytetrafluoroethylene and polyvinylidene fluoride; a perfluorosulfonate polymer, a perfluoro-carboxylate polymer, a perfluoro-phosphate polymer and the like in which a sulfonic group, a carboxyl group, a phosphate group, a sulfonium group, an ammonium group, a pyridinium group and the like are introduced into a skeleton of the fluorine-containing polymer; a polybutadiene-based compound; a polyurethane-based compound such as an elastomer and a gel; a silicone-based compound; polyvinyl chloride; polyethylene terephthalate; nylon; a polyarylate, and the like. In addition, such a polymer having electroconductivity as described above can also be used. For information, these polymer binders may be used solely or in combination with other one or more polymer binders. The polymer binders may be also functionalized, and may be a copolymer with other polymers.

Among these polymer binders, the polymer which can be particularly used include: polyvinylidene fluoride-hexafluoropropylene copolymer [PVDF (HFP)], polyvinylidene fluoride (PVDF), perfluoro-sulfonate (Nafion), 2-hydroxyethyl methacrylate (HEMA), polymethylmethacrylate (PMMA), polyethylene oxide (PEO), polyacrylonitrile (PAN) and the like. In addition, the above described polymer can be a polymer which is highly compatible with the ionic conduction layer. Thereby, the polymer binder has higher compatibility and bondability with the ionic conduction layer, and thereby can constitute a stronger electrode. For this purpose, the above described polymer binder can be a polymer which includes a polymer structure of the same type as, a similar to or the same as the polymer compound which constitutes the above described ionic conduction layer, or a polymer which includes a functional group of the same type as, a similar to or the same as the polymer compound.

Furthermore, the above described polymer binder can employ also a metal oxide which includes a polymer structure obtained through a sol-gel process and the like. Such a metal oxide is not limited in particular, but can employ, for instance, metal oxides based on manganese, nickel and cobalt, and vanadium pentoxide.

An electric resistance value of the electrode layer according to the present invention can be not more than 1,000 ωcm, and can further be not more than 100 ωcm. By setting the electric resistance value of the above described electrode layer at a value not more than 1,000 ωcm, the actuator of the present invention can be bent when a low voltage is applied to the electrodes. The above described electrode layer may contain other components in addition to the polymer binder and the above described conductive material, unless the composition gives unfavorable influence on the function of a soft actuator. The ionic conduction layer of the present invention contains the ionic material, and can contain the polymer because the polymer retains the ionic material and secures the mechanical strength and the flexibility.

The mass ratio of components of the ionic liquid/ionic material (A) and the polymer compound (B) in the ionic conduction layer of the present invention is not limited in particular, but can be approximately (A)/(B)=0.1:1 to 10:1 from the viewpoint of the ion conductivity and the mechanical strength of the ionic conduction layer.

The content of the ionic liquid/ionic material can be not less than 30 wt % and not more than 80 wt % with respect to the content of the polymer compound. If the content is less than 30 wt %, the ionic material may not be sufficiently supplied to the electrode layer when voltage has been applied. When the content is larger than 80 wt %, the mechanical strength of the ionic conduction layer becomes weak and a sufficient acting force may not be obtained, when the actuator bends/deforms.

In the present invention, a polymer compound which can be used for providing the ionic conduction layer includes, for instance: a fluorine-containing polymer such as tetrafluoroethylene and polyvinylidene fluoride; a polyolefin-based polymer; a polybutadiene-based compound; a polyurethane-based compound such as an elastomer and a gel; a silicone-based compound; thermoplastic polystyrene; polyvinyl chloride; and polyethylene terephthalate. For information, these polymer compounds may be used solely or in combination with other one or more polymer compounds. The polymer compounds may be also functionalized, and may be a copolymer with other polymers. The above described polymer compound needs to contain the ionic material. Thereby, when the voltage is applied, the actuator including the above described non-ionic polymer compound can bend and deform.

In the present invention, when the ionic material is the ionic liquid, the polymer compound includes polyvinylidene fluoride-hexafluoropropylene copolymer [PVDF (HFP)], polyvinylidene fluoride (PVDF), perfluoro-sulfonate (Nafion), 2-hydroxyethyl methacrylate (HEMA), polymethylmethacrylate (PMMA), polyethylene oxide (PEO), polyacrylonitrile (PAN) and the like, but is not limited in particular. The ionic material may be used from among these polymer compounds solely or may be used in combination with other one or more polymer compounds. The polymer which is used for the electrode layer and the polymer which is used for the ionic conduction layer may be the same and may be also different from each other.

(Method for Manufacturing Actuator)

A method for manufacturing the electrode layer which can be used in the present invention is not limited in particular as long as the conductive material is dispersed/retained in the electrode layer, but includes a method of subdividing the conductive material while adding a shearing operation to the conductive material in the presence of the ionic liquid and the polymer as needed to form a dispersion of the conductive material, forming layer from the dispersion and stacking the layers.

A unit of imparting a shearing force to the conductive material in this subdivision process is not limited in particular, and may be a unit of mashing the conductive material with a manual mortar and an automatic mortar, when the dispersion is manufactured, for instance, in a small scale such as in a laboratory. In addition, when a large-scale manufacture is aimed, a wet crushing equipment such as a ball mill, a roller mill and a vibration mill, which can impart a high shearing force to the conductive material, can be used. Furthermore, a kneading machine of a kneader type can also be used. In consideration of the viscosity of the dispersion, it is also possible to give the shearing force to the conductive material after having added a solvent to the dispersion to adjust the viscosity moderately. A period of time necessary for subdividing the conductive material is also not limited in particular. The time can be appropriately changed according to degrees of subdivision necessary in applications, but generally is approximately 5 minutes to 1 hour. The dispersion of the conductive material can be obtained through the above described processes.

A method of forming a layer by using the dispersion of the conductive material and obtaining the electrode layer is not limited in particular, but may be a method of forming the layer by using a casting method, a spin coating method, a printing method, a spraying method and the like, vaporizing the solvent and drying the remaining layer. An extrusion process and an injection method also can be used.

The generation mechanism and the structure of a gel composition which includes the carbon nanotube and the ionic liquid and can be used in the present invention are not yet fully clear, but the outline can be understood in the following way from various analysis results. (1) The subdivision treatment under the shearing force does not cause a chemical denaturation of the carbon nanotube, but reduces mutual entanglement among the carbon nanotubes, and causes such a change of their physical shape that the bundle is thinned down. (2) It is supposed that the gel is not formed due to the entanglement among the carbon nanotubes, but is formed by a cross linkage structure (three-dimensional network structure) which is formed by such an action that the molecules of the ionic liquid bonded to the surface of the carbon nanotubes, which reduce the entanglement, by an interaction of "cation-$\pi$" combine the bundles of the carbon nanotubes with each other through an ionic bond.

The thickness of the electrode layer is not less than 1 $\mu$m and not more than 5 mm, can be not less than 5 $\mu$m and not more than 2 mm, and can further be not less than 10 $\mu$m and not more than 500 $\mu$m. When the layer thickness is more than 5 mm, the elastic modulus of the layer increases, which occasionally suppresses the bending movement of the actuator. When the layer thickness is less than 1 $\mu$m, the amount of the ionic material which transfers/permeates into the electrode layer is small, and the bending movement cannot be sufficiently obtained occasionally.

A method for manufacturing the electrode layer in which the content of the conductive material increases step by step or continuously in the direction from the moving part to the stationary part is not limited in particular, but includes a method of aligning a plurality of dispersions of the conductive material including different contents of the conductive material in order of the content and then simultaneously layer-forming/drying the aligned dispersions of the conductive material to produce one electrode layer, a method of producing a plurality of electrode layers including different contents of the conductive material previously and separately, aligning the plurality of electrode layers in order of the content, pressure and heat fusion-bonding the electrode layers to integrate them and produce one electrode layer, and the like.

The method of producing one electrode layer by aligning the plurality of dispersions of the conductive material including different contents of the conductive material in order of the content, and simultaneously layer-forming/drying the dispersions of the conductive material is a manufacturing method including the three processes of: dispersing the conductive material and the ionic material together with a polymer into a solvent to obtain dispersions of the conductive material including different contents of the conductive material; casting the conductive dispersions obtained in the previous process on a substrate in order of a high content or in order of a low content of the conductive material, and obtaining a coating layer with an applicator or the like; and drying the coating layer at room temperature or in a vacuum to obtain one electrode layer.

The method for producing a plurality of electrode layers including different contents of the conductive material previously and separately, aligning the electrode layers in order of the content, pressure and heat fusion-bonding the electrode layers to integrate and produce one electrode layer is a manufacturing method including the four process of: dispersing the conductive material and the ionic material together with a polymer into a solvent to obtain several dispersions of the conductive material including different contents of the conductive material; obtaining coating layers by casting or spin-coating each of the dispersions of the conductive material obtained in the previous process separately; drying the coated layers obtained in the previous process at room temperature or in a vacuum to obtain a plurality of electrode layers including different contents; and aligning the electrode layers obtained in the previous process on the substrate so that the content of the conductive material increases or decreases in one direction, pressure and heat fusion-bonding the aligned electrode layers by a hot press and the like to integrate the conductive material and to form one electrode layer. In the above described manufacturing method, the process of casting or spin-coating the dispersions of the conductive material may be replaced with a process of pouring each of the dispersions of the conductive material including different contents of the conductive material onto the substrate having a spacer separately to flatten the dispersion while using the spacer as a guide.

The substrate which is used for the above described production may be a substrate such as glass, and may be an ionic conduction layer. The method for producing the electrode layer in which the content of the above described conductive material increases step by step or continuously in a direction from the moving part to the stationary part includes the above described production methods, but is not limited to these methods. The content of the conductive material in the present invention may increase step by step or continuously in a direction from the moving part to the stationary part, and a difference between the concentration of the above described conductive material in the moving part and the concentration of the above described conductive material in the stationary part can be not less than 3 wt %. When the difference between the concentrations is less than 3 wt %, sufficient displacement is not obtained in the vicinity of the moving part occasionally.

A method of producing the electrode layer in which the thickness of the above described electrode layer increases step by step or continuously in the direction from the moving part to the stationary part is not limited in particular, but includes: a method of producing the electrode layer by pouring the dispersion of the conductive material onto a substrate having a spacer of which the thickness changes step by step or continuously; a method of producing one electrode layer by previously producing a plurality of electrode layers and aligning the electrode layers so that the thickness increases in one direction, and pressure and heat fusion-bonding the electrode layers to integrate the electrode layers; and a method of producing the electrode layer with a dipping process.

The method for producing the electrode layer by pouring the dispersion of the conductive material onto the substrate having the spacer of which the thickness changes step by step or continuously is a production method including the three processes of: dispersing the conductive material and the ionic material together with a polymer into the solvent to obtain the dispersion of the conductive material; pouring the conductive dispersion obtained in the previous process onto the substrate having the spacer of which the thickness changes step by step or continuously; and drying the dispersion at room temperature or in a vacuum to obtain an electrode layer.

The method of producing one electrode layer by producing a plurality of electrode layers previously, stacking the electrode layers gradually so that the thickness increases in one direction, and pressure and heat fusion-bonding the layers to integrate the electrode layers is a production method including the four processes of: dispersing the conductive material and the ionic material together with the polymer into the solvent to obtain the dispersion of the conductive material; obtaining each of coating layers by casting or spin-coating the dispersion of the conductive material obtained in the previous process separately; drying the coated layers at room temperature or in a vacuum to obtain the electrode layers; stacking the obtained electrode layers on the substrate gradually so that the thickness increases in one direction, and pressure and heat fusion-bonding the stacked electrode layers with a hot press and the like to integrate the electrode layers and obtaining one electrode layer. Here, the method of stacking the electrode layer gradually so that the thickness increases in one direction may be a method of repeating an operation of stacking a shorter electrode layer on one electrode layer and stacking a still shorter electrode layer thereon to form a stair shape, a method of repeating an operation of spreading a plurality of the electrode layers on the surface of the substrate and spreading the electrode layers thereon to form the stair shape, or may be a combined method of the both methods. In the production method, the process of casting and spin-coating the dispersion of the conductive material may be replaced with a process of pouring the dispersion of the conductive material onto a substrate having a spacer to flatten the dispersion while using the spacer as a guide to thereby obtain the electrode layer.

In addition, the method of producing the electrode layer with the dipping process may be a production method including the three processes of: dispersing the conductive material and the ionic material with the polymer into the solvent to produce the dispersion of the conductive material; dipping the substrate into the dispersion of the conductive material obtained in the previous process; and drying the substrate at room temperature or in a vacuum in such a state that one end of the surface direction directs upward and the opposite end directs downward to obtain the electrode layer.

The substrate which is used for the above described production may be a substrate such as glass, and may be an ionic conduction layer. The method for producing the electrode layer of which the thickness increases step by step or continuously in the direction from the moving part to the stationary part includes the above described production methods, but is not limited to these methods.

The thickness of the electrode layer of the present invention may increase step by step or continuously in the direction from the moving part to the stationary part, and a difference between the thickness of the electrode layer of the moving part and the thickness of the electrode layer of the stationary part is not less than 1 µm. When the difference between the thicknesses is less than 1 µm, sufficient displacement is not obtained in the vicinity of the moving part occasionally.

A method of manufacturing an electrode layer in which the void fraction of the above described electrode layer decreases step by step or continuously in the direction from the moving part to the stationary part is not limited in particular, but includes a method of aligning a plurality of dispersions of the conductive material including different void fractions of the electrode layer in order of a content of the void fraction and then layer-forming/drying the dispersions of the conductive material simultaneously to produce one electrode layer, a method of producing a plurality of electrode layers including different void fractions of the electrode layer previously and separately, aligning the electrode layers in order of a content of the void fraction, pressure and heat fusion-bonding the aligned electrode layers to integrate the electrode layer and producing one electrode layer, and the like.

The method of aligning a plurality of the dispersions of the conductive material including different void fractions of the electrode layer in order of the content of the void fraction and then layer-forming/drying the dispersions of the conductive material simultaneously to produce one electrode layer is a production method including the three processes of: dispersing the polymers including different contents together with the conductive material and the ionic material into the solvent to obtain several dispersions of the conductive material including different polymer contents; casting the conductive dispersions obtained in the previous process on a substrate in order of a high polymer content or in order of a low polymer content, obtaining a coating layer with an applicator and the like; drying the coated layer at room temperature or in a vacuum to obtain one electrode layer.

The method for producing a plurality of the electrode layers including different void fractions of the electrode layer previously and separately, aligning the electrode layers in order of the content of the void fraction, and pressure and heat fusion-bonding the aligned electrode layers to integrate the electrode layer and producing one electrode layer is a production method including the four processes of: dispersing the polymers including different contents into the solvents together with the conductive material and the ionic material to obtain several dispersions of the conductive material including different polymer contents; obtaining coating layers by separately casting or spin-coating each of the dispersions of the conductive material obtained in the previous process; drying the coated layers obtained in the previous process at room temperature or in a vacuum to obtain a plurality of electrode layers including different void fractions; aligning the electrode layers obtained in the previous process on the substrate so that the void fraction increases or decreases in one direction, and pressure and heat fusion-bonding the aligned electrode layers by a hot press and the like to integrate the conductive materials and producing one electrode layer. In the above described production method, the process of casting or spin-coating the dispersions of the conductive material may be replaced with a process of pouring each of the dispersions of the conductive material including different contents of the polymer onto the substrate having a spacer separately to flatten the dispersions while using the spacer as a guide.

In the above described manufacturing method, it is possible to obtain porous layers including different void fractions by adding salt such as lithium chloride, poor solvent and the like including different concentrations to the dispersions of the conductive material to cause a phase separation therein. Thereby, the electrode layer in which the void fraction decreases step by step or continuously in the direction from the moving part to the stationary part can be obtained in a similar method to the above described manufacturing method.

The substrate which is used for the above described production may be a substrate such as glass, and may be an ionic conduction layer. The method for producing the electrode layer in which the void fraction of the above described electrode layer decreases step by step or continuously in the direction from the moving part to the stationary part includes the above described production methods, but is not limited to the above described production methods.

The void fraction in the electrode layer in the present invention can be not more than 90 vol %. The void fraction of the electrode layer of the present invention may decrease step by step or continuously in the direction from the moving part to the stationary part, and a difference of the void fractions between in the moving part and in the stationary part can be not less than 5 vol %. When the difference of the void fractions is less than 5 vol %, sufficient displacement is not obtained in the vicinity of the moving part occasionally.

A method for manufacturing the ionic conduction layer of the present invention may be any method as long as the ionic material is retained in the ionic conduction layer, and is not limited in particular. The ionic conduction layer of the present invention contains the ionic material, and can contain a polymer so as to retain the ionic material and keep a mechanical strength of the electrode layer. For instance, it is possible to use: a method of dissolving/dispersing the ionic material and the polymer in a solvent to obtain an ionic composition, forming a layer by subjecting the obtained composition to a casting method, a spin coating method, a printing method, a spraying method and the like, vaporizing the solvent and drying the remaining layer; a method of heating and melting a polymer, kneading the molten polymer together with an ionic material and forming a layer; and also an extrusion process, an injection method and the like.

A solvent which is used when the electrode layer and the ionic conduction layer are produced may be any solvent as long as the conductive material, the ionic material and the polymer can be adequately dispersed therein, and is not limited in particular, but includes, for instance, 4-methyl-2-pentanone, N-methyl-2-pyrrolidone, dimethylformamide, N,N-dimethylacetamide and the like. The solvent may be used from among these solvents solely or in combination with other one or more solvents.

The thickness of the ionic conduction layer of the present invention can be not less than 1 μm and not more than 5 mm, and can further be not less than 10 μm and not more than 500 μm. When the layer thickness is more than 5 mm, the elastic modulus of the layer increases, which occasionally suppresses the bending movement of the actuator. In addition, when the layer thickness is less than 1 μm, the amount of the ionic material which can be retained by the ionic conduction layer is a little and the amount to be supplied to the electrode layer becomes a little. Accordingly, a sufficient bending movement cannot be obtained occasionally.

In the method for manufacturing the actuator of the present invention, a method of obtaining a structure in which a pair of electrode layers sandwiches an ionic conduction layer, in which the content of the conductive material in the cross section in a direction perpendicular to the direction from the moving part to the stationary part increases step by step or continuously in a direction from the moving part to the stationary part, is not limited in particular, but includes a method of producing each of the electrode layer and the ionic conduction layer with the above described manufacturing method separately, stacking the layers in the direction from the moving part to the stationary part in order of being desired to be stacked, and pressure and heat fusion-bonding the layers by a hot press and the like to stack the layers. Alternatively, the method includes a method of producing a stacked body by producing the electrode layers on both surfaces of the ionic conduction layer, when the electrode layer is produced by the above described method for manufacturing the electrode layer.

The stacking order may be an order in a direction from a moving part to a stationary part, and may be an order of being desired to be stacked in a direction from the stationary part to the moving part. Here, the order of being desired to be stacked is, for instance, such an order that the content of the above described conductive material increases in the direction from the moving part to the stationary part, such an order that the thickness of the above described electrode layer increases in the direction, and such an order that the above described void fraction decreases in the direction. The above described methods may also be used in combination. The electrode layer may be produced by stacking some electrode layers and then pressure and heat fusion-bonding the layers, and may be produced by applying/layer-forming/drying the above described dispersion of the conductive material continuously and repeatedly.

The drive method of the actuator in the present invention is not limited in particular as long as the actuator largely bends in such a direction that one electrode layer further extends compared to the other electrode layer, large displacement is obtained in the moving part, and voltage is applied between a pair of the electrode layers so that a great generating force can be obtained in the vicinity of the stationary part. For instance, the drive method includes a drive method of fixing a site including a large content of the conductive material in the electrode layer with a stationary part provided with electrodes, setting one electrode layer as a cathode and the other electrode layer as an anode, and applying the voltage between both of the electrode layers.

In addition, the actuator of the present invention bends and deforms, when the voltage of not more than 10 V is applied between the above described electrodes. The direction of bending deformation, the displacement, the displacement speed and the like vary depending on types of the electrode layer/ionic conduction layer, a composition/constitution of the electrode, types of transferring ions and the like. In addition, when the polarity of the potential is reversed, a film usually bends and deforms to an opposite direction.

In the present invention, the voltage applied between both electrode layers of the pair of the electrode layers can be not more than 10 V, can be used in such a range (potential window) that the ionic material is not decomposed when the voltage has been applied therebetween, and can further be not more than 4 V.

When the actuator of the present invention is actually used in a device such as a robot and a micromachine, the actuator needs to fix at least one part of the actuator and exert the action on the device. In order to exert a greater action on the device, a distant position from the stationary part can be a moving part.

FIGS. 1A and 1B illustrate an outline of one example of a structure of the actuator in the present invention when the actuator is used in a device. FIGS. 1A and 1B illustrate an outline when the actuator is installed so as to act in such a direction 450 as to push a portion 440 exerted by the moving part. The stationary part 20 of the actuator is fixed to one part 10 of the device by a fixing tool 9 provided with electrodes. As for the moving part, a distant position from the stationary part is determined to be the moving part 30, and the actuator is installed so as to push the portion 440 exerted by the moving part. Here, the moving direction may be any direction as long as the actuator bending-moves and exerts the action, and is not limited to the pushing direction 450. The position at which the portion 440 exerted by the moving part is installed may be a position at which the bending movement of the actuator can exert an action on the portion 440.

The actuator of the present invention presents with the large displacement in the vicinity of the moving part as was described above, has a great generating force in the vicinity of the stationary part, accordingly exerts a great action on the device such as a robot and a micromachine, has a great generating force in the vicinity of the stationary part, and enhances its durability. These are examples in which the actuator is installed in the device, but are not limited to these examples.

Exemplary Embodiments

The present invention will be described below in detail with reference to exemplary embodiments, but the present invention is not limited to these exemplary embodiments.

(Ionic Material)

An ionic material used in the exemplary embodiment is 1-butyl-3-methyl imidazolium tetrafluoroborate ($BMIBF_4$) (Kanto Chemical Co., Inc.) which is an ionic liquid.

(Polymer)

A polymer used in the exemplary embodiment is a polyvinylidene fluoride-hexafluoropropylene copolymer (PVdF (HFP)) expressed by the following formula (6).

(6)

(Conductive Material)

Conductive materials used in the exemplary embodiment are a monolayer carbon nanotube (SWNT) (HiPco, Carbon Nanotechnologies Incorporated) and acetylene black (DENKA BLACK, Denki Kagaku Kogyo Kabushiki Kaisha).

(Actuator)

An actuator used in the exemplary embodiment is an actuator in which a pair of electrode layers including SWNT/$BMIBF_4$/PVdF (HFP) sandwiches an ionic conduction layer including PVdF (HFP)/$BMIBF_4$.

(Organic Solvent)

An organic solvent used in the exemplary embodiment is N,N-dimethylacetamide (DMAc) (Kishida Chemical Co., Ltd.).

(Evaluation of Generating Force)

A generating force is measured by using a load cell (model UL-10GR, Minebea Co., Ltd.) when the actuator is bent. A portion of 2 mm from an end of an actuator cut out into a size of a width of 1 mm (W) and a length of 12 mm (L) is sandwiched by a holder provided with electrodes, one electrode layer of the actuator is set as a cathode, the other electrode layer is set as an anode, and a voltage of 2.5 V is applied between both of the electrode layers in the air (drive in the air) to bend the actuator. Then, a generating force at a position of 2 mm apart from the fixed end of the actuator is measured with the use of a load cell.

(Evaluation of Displacement)

The displacement at the time when the actuator is bent is measured with the use of a laser displacement meter. A portion (fixed end) of 2 mm from an end of the actuator cut out into the size of the width of 1 mm (W) and the length of 12 mm (L) is sandwiched by the holder provided with electrodes and a voltage of 2.5 V is applied in the air (drive in the air) to bend the actuator. Then, the displacement at a position of 8 mm apart from the fixed end is measured with the use of the laser displacement meter.

Exemplary Embodiment 1

An actuator is produced, in which the pair of the electrode layers including a content of the conductive material increasing in a direction from a moving part to a stationary part sandwiches the ionic conduction layer.

(Production of Dispersions 1 to 5 of a Conductive Material for Producing an Electrode Layer)

The electrode layer is produced as follows. An organic solvent (DMAc) in an amount of 1 mL is added to 10 mg of a monolayer carbon nanotube (SWNT) which is a conductive material and 100 mg of $BMIBF_4$ which is an ionic liquid, and a composition is obtained by dispersing the mixture with a ball mill (a planet type particle grinder, Fritsch GmbH) using a zirconia ball (a grain size of 2 mm) at 200 rpm for 30 minutes. Subsequently, a solution in which 80 mg of PVdF (HFP) is dissolved in 2 mL of DMAc is added to the composition obtained by the ball mill, and the mixture is further dispersed by a ball mill at 500 rpm for 30 minutes. As a result, a dispersion 1 of the conductive material is obtained, which has high viscosity and contains the uniformly dispersed conductive material.

A dispersion 2 of the conductive material is obtained by changing the amount of SWNT that is used when the above described dispersion 1 of the conductive material is produced, from 10 mg to 30 mg, and by producing the dispersion on the same conditions except for the amount. A dispersion 3 of the conductive material is obtained by changing the amount of SWNT that is used when the above described dispersion 1 of the conductive material is produced, from 10 mg to 50 mg, and by producing the dispersion on the same conditions except for the amount.

A dispersion 4 of the conductive material is obtained by changing the amount of SWNT that is used when the above described dispersion 1 of the conductive material is produced, from 10 mg to 70 mg, and by producing the dispersion on the same conditions except for the amount. A dispersion 5 of the conductive material is obtained by changing the amount of SWNT that is used when the above described dispersion 1 of the conductive material is produced, from 10 mg to 80 mg, and by producing the dispersion on the same conditions except for the amount.

(Production of an Ionic Composition 1 for Producing an Ionic Conduction Layer)

In order to produce the ionic conduction layer, an ionic composition containing an ionic liquid and a polymer is produced as follows. The ionic composition 1 containing clear colorless ionic liquid and polymer is obtained by heating and mixing 100 mg of PVdF (HFP), 100 mg of $BMIBF_4$ and 1 mL of DMAc at 80° C.

(Production of an Actuator)

An actuator in which the electrode layers including the content of the conductive material increasing in the direction from the moving part to the stationary part sandwich the ionic conduction layer is produced as follows, by using the dispersions 1 to 5 of the conductive material obtained in Exemplary Embodiment 1. Firstly, the ionic conduction layer is obtained by pouring the ionic composition 1 including PVdF(HFP)/$BMIBF_4$/DMAc obtained in the above description onto a substrate having a spacer with a thickness of 100 µm, flattening the ionic composition while using the spacer as a guide and drying the composition at room temperature.

Next, a coating layer was produced by sequentially using a film applicator provided with a micrometer (Hohsen Corp.) to adjust a gap between the applicator and the substrate to 100 µm and applying the above described dispersions 1 to 5 of the conductive material onto the substrate at spaces of 2 mm. One electrode layer is obtained by drying the coating layer at room temperature, and the other electrode layer is obtained on the same conditions. Next, two electrode layers are stacked so as to sandwich the ionic conduction layer so that the order of the applied dispersions 1 to 5 of the conductive material matches in the same direction, and the actuator is obtained by pressure and heat fusion-bonding the assembly at 100° C. and 0.5 kN with the use of a hot press (Tester Sangyo Co., Ltd.). It is confirmed that the pair of the electrode layers sandwiches the ionic conduction layer, by observing the cross section of the obtained actuator with a scanning electron microscope (SEM) (S-4800, Hitachi High-Technologies Corporation).

Comparative Example 1

An actuator is produced, in which a pair of electrode layers including a content of the conductive material consistent in a direction from a moving part to a stationary part sandwiches the ionic conduction layer. The actuator is obtained in a similar method to that in Exemplary Embodiment 1, by using an electrode layer which has been produced by using only the dispersion 1 of the conductive material obtained in Exemplary Embodiment 1 on the same conditions as in Exemplary Embodiment 1 except for the dispersion. It is confirmed that the pair of the electrode layers sandwiches the ionic conduction layer, by observing the cross section of the obtained actuator with SEM.

Comparative Example 2

An actuator is produced, in which a pair of electrode layers including a content of the conductive material consistent in a direction from a moving part to a stationary part sandwiches the ionic conduction layer. The actuator is obtained in a similar method to that in Exemplary Embodiment 1, by using an electrode layer which has been produced by using only the dispersion 5 of the conductive material obtained in Exemplary Embodiment 1 on the same conditions as in Exemplary Embodiment 1 except for the dispersion. It is confirmed that the pair of the electrode layers sandwiches the ionic conduction layer, by observing the cross section of the obtained actuator with SEM.

<Evaluation>

(Content of a Conductive Material Contained in an Electrode Layer)

The contents A of the conductive material contained in the electrode layers of Exemplary Embodiment 1 and the Comparative Examples 1 and 2 are evaluated as follows.

Four cross sections at spaces of every 2 mm in the direction from the stationary part end to the moving part of the actuator are observed by SEM, and each cross-sectional area S ($mm^2$) of four cross sections is calculated from the thickness and the width of the cross section. On the other hand, an area ratio of the conductive material to the other region is calculated, which is obtained by image processing through the binarization of the images of measured cross sections and the like, and each content A ($mm^2$) of the conductive material is calculated from the relation to the cross-sectional area, by using the expression: A=(cross-sectional area)×(area ratio of the conductive material)/(area ratio of the conductive material+area ratio of the other region).

(The Thickness of an Electrode Layer)

For determining the thickness of the electrode layer, the cross section of the actuator was observed with SEM.

(Generating Force in the Vicinity of a Stationary Part)

When the end including a larger content of the conductive material of the actuator is fixed by the stationary part provided with the electrode, one electrode layer is set as a cathode, the other electrode layer is set as an anode and the voltage of 2.5 V is applied between both of the electrode layers, the actuator is bent to such a direction that the cathodic electrode layer extends more than the anodic electrode layer. When the actuator is thus bent, the generating force in the vicinity of the stationary part is measured with a load cell at the position of 2 mm apart from the stationary part end.

(Displacement in a Moving Part)

When the actuator is bent to such a direction that the cathodic electrode layer extends more than the anodic electrode layer, in the above described measurement of the generating force in the vicinity of the stationary part, the displacement in the moving part is measured with a laser displacement meter at the position of 8 mm apart from the stationary part end.

The results of Exemplary Embodiment 1 and Comparative Examples 1 and 2 are shown in Table 1.

TABLE 1

|  | Exemplary Embodiment 1 | Comparative Example 1 | Comparative Example 2 |
| --- | --- | --- | --- |
| Content (A) ($mm^2$) | 0.002/0.006/0.009/0.013/0.015 | Each one 0.002 | Each one 0.015 |
| Layer thickness (µm) | Each one 50 | Each one 50 | Each one 50 |
| Generating force (N) in the vicinity of stationary part | 0.025 | 0.005 | 0.025 |
| Displacement (mm) in moving part | 5.0 | 2.5 | 1.0 |

The numerical values in each item of Exemplary Embodiment 1 in Table 1 are shown in order of the direction from the moving part (content: 0.002) to the stationary part (content: 0.015) respectively.

When the cross sections of the arbitrary parts of the actuator in Exemplary Embodiment 1 are observed, the content of the conductive material increases step by step or continuously in the direction from the moving part to the stationary part.

In addition, a portion exerted by the moving part was arranged at the position of 8 mm apart from the stationary part end of the actuator, and an ON/OFF operation was repeated 12,000 times at 0.1 Hz while a voltage of 2.5 V was applied to the actuators obtained in Exemplary Embodiment 1 and the Comparative Examples 1 and 2. As a result, a crack/rupture and the like have not been observed in the actuators of Exemplary Embodiment 1 and the Comparative Example 2. On the other hand, a crack/rupture and the like were partially observed in the vicinity of the stationary part in the actuator of the Comparative Example 1.

Exemplary Embodiment 2

An actuator is produced, in which a pair of electrode layers of which the thickness increases in the direction from the moving part to the stationary part sandwiches an ionic conduction layer. The electrode layer which is used for Exemplary Embodiment 2 is produced as follows. An organic solvent (DMAc) in an amount of 10 mL is added to 800 mg of SWNT which is a conductive material and 100 mg of $BMIBF_4$ which is an ionic liquid, and a composition is obtained by dispersing the mixture with a ball mill using a zirconia ball (with a grain size of 2 mm) at 200 rpm for 30 minutes. Subsequently, a solution in which 800 mg of PVdF (HFP) is dissolved in 20 mL of DMAc is added to the composition obtained by the ball mill, and the mixture is further dispersed by a ball mill at 500 rpm for 30 minutes. As a result, a dispersion 6 of the conductive material is obtained, which has high viscosity and contains the uniformly dispersed conductive material.

Next, the actuator is produced, in which the electrode layers of which the layer thickness increases in the direction from the moving part to the stationary part sandwich the ionic conduction layer. Firstly, one electrode layer is obtained by pouring the dispersion 6 of the conductive material produced in the above description onto a substrate having a spacer of which the thickness continuously decreases from 200 μm to 80 μm, flattening the dispersion while using the spacer as a guide, and drying the dispersion at room temperature.

Next, the ionic conduction layer is obtained by stacking another spacer with the thickness of 60 μm on the obtained electrode layer, pouring the ionic composition 1 which was obtained in Exemplary Embodiment 1 and includes PVdF (HFP)/$BMIBF_4$/DMAc onto the electrode layer, flattening the ionic composition while using the spacer as a guide, and drying the ionic composition at room temperature.

The actuator is obtained further stacking other spacer of which the thickness continuously decreases from 200 μm to 80 μm on the ionic conduction layer so that the direction matches the direction in which the thickness of the first spacer decreases from 200 μm to 80 μm, pouring the dispersion 6 of the conductive material produced in the above description onto the ionic conduction layer, flattening the dispersion while using the spacer as a guide, drying the dispersion at room temperature to form the other electrode layer, and then vacuum-drying the assembly overnight. It is confirmed that the pair of the electrode layers sandwiches the ionic conduction layer, by observing the cross section of the obtained actuator with SEM.

Comparative Example 3

An actuator is produced, in which a pair of electrode layers of which the thickness is consistent in the direction from the moving part to the stationary part sandwiches an ionic conduction layer. The actuator in which the electrode layers of which the thickness is consistent in the direction from the moving part to the stationary part sandwich the ionic conduction layer is produced as follows, by using the dispersion 6 of the conductive material obtained in Exemplary Embodiment 2.

Firstly, an electrode layer is obtained by pouring the dispersion 6 of the conductive material onto a substrate having a spacer with a thickness of 80 μm, flattening the dispersion while using the spacer as a guide, and drying the dispersion at room temperature. Next, the ionic conduction layer is obtained by stacking another spacer with the thickness of 60 μm on the obtained electrode layer, pouring the ionic composition 1 which was obtained in Exemplary Embodiment 1 and includes PVdF(HFP)/$BMIBF_4$/DMAc onto the electrode layer, flattening the ionic composition while using the spacer as a guide, and drying the ionic composition at room temperature. The actuator is obtained further stacking other spacer with the thickness of 80 μm on the ionic conduction layer, pouring the above described dispersion 6 of the conductive material onto the ionic conduction layer, flattening the dispersion while using the spacer as a guide, drying the dispersion at room temperature to form the other electrode layer, and then vacuum-drying the assembly overnight.

It is confirmed that the pair of the electrode layers sandwiches the ionic conduction layer, by observing the cross section of the obtained actuator with SEM.

Comparative Example 4

An actuator is produced, in which a pair of electrode layers of which the thickness is consistent in the direction from the moving part to the stationary part sandwiches an ionic conduction layer. The actuator in which the electrode layers of which the thickness is consistent in the direction from the moving part to the stationary part sandwich the ionic conduction layer is produced as follows, by using the dispersion 6 of the conductive material obtained in Exemplary Embodiment 2.

Firstly, an electrode layer is obtained by pouring the dispersion 6 of the conductive material onto a substrate having a spacer with a thickness of 200 μm, flattening the dispersion while using the spacer as a guide, and drying the dispersion at room temperature. Next, the ionic conduction layer is obtained by stacking another spacer with the thickness of 60 μm on the obtained electrode layer, pouring the ionic composition 1 which has been obtained in Exemplary Embodiment 1 and includes PVdF(HFP)/$BMIBF_4$/DMAc onto the electrode layer, flattening the ionic composition while using the spacer as a guide, and drying the ionic composition at room temperature. The actuator is obtained further stacking other spacer with the thickness of 200 μm on the ionic conduction layer, pouring the dispersion 6 of the conductive material produced in the above description onto the ionic conduction layer, flattening the dispersion while using the spacer as a guide, drying the dispersion at room temperature to form the other electrode layer, and then vacuum-drying the assembly overnight.

It is confirmed that the pair of the electrode layers sandwiches the ionic conduction layer, by observing the cross section of the obtained actuator with SEM.

(Thickness of the Electrode Layer)

The thickness of the electrode layer is measured by observing the cross section of the actuator with SEM.

The results of Exemplary Embodiment 2 and the Comparative Examples 3 and 4 are shown in Table 2.

TABLE 2

|  | Exemplary Embodiment 2 | Comparative Example 3 | Comparative Example 4 |
|---|---|---|---|
| Content (A) (mm$^2$) | 0.010/0.016/0.021/0.026/0.031 | Each one 0.010 | Each one 0.031 |
| Layer thickness (µm) | 50/75/100/125/150 | Each one 50 | Each one 150 |
| Generating force (N) in the vicinity of stationary part | 0.023 | 0.008 | 0.023 |
| Displacement (mm) in moving part | 5.5 | 2.0 | 1.0 |

The numerical values in each item of Exemplary Embodiment 2 in Table 2 are shown in order of the direction from the moving part (content: 0.010, and layer thickness: 50) to the stationary part (content: 0.031, and layer thickness: 150) respectively. A generating force in the vicinity of the stationary part and displacement in the moving part have been measured by fixing the end including a larger layer thickness of the electrode layer by the stationary part provided with electrodes.

When the cross sections of the arbitrary parts of the actuator in Exemplary Embodiment 2 are observed, it is understood that the thickness of the electrode layer increases step by step or continuously in the direction from the moving part to the stationary part. In addition, a portion exerted by the moving part was arranged at the position of 8 mm apart from the stationary part end of the actuators obtained in Exemplary Embodiment 2 and the Comparative Examples 3 and 4, and an ON/OFF operation was repeated 12,000 times at 0.1 Hz while a voltage of 2.5 V was applied. As a result, a crack/rupture and the like have not been observed in the actuators of Exemplary Embodiment 2 and the Comparative Example 4. On the other hand, a crack/rupture and the like were partially observed in the vicinity of the stationary part in the actuator of the Comparative Example 3.

Exemplary Embodiment 3

An actuator is produced, in which a pair of electrode layers of which the void fraction decreases in the direction from the moving part to the stationary part sandwiches the ionic conduction layer. The dispersion 7 of the conductive material is obtained by changing the weight of an SWNT from 10 mg to 20 mg, and the weight of PVdF(HFP) from 80 mg to 160 mg, which are used when the dispersion 1 of the conductive material is produced in Exemplary Embodiment 1, and by producing the dispersion on the same conditions as in Exemplary Embodiment 1 except for these weights. Similarly, a dispersion 8 of the conductive material is obtained by changing the weight of the SWNT from 10 mg to 35 mg, and the weight of PVdF(HFP) from 80 mg to 140 mg, by producing the dispersion on the same conditions as in Exemplary Embodiment 1 except for these weights. Similarly, a dispersion 9 of the conductive material is obtained by changing the weight of the SWNT from 10 mg to 50 mg, and the weight of PVdF(HFP) from 80 mg to 120 mg, by producing the dispersion on the same conditions as in Exemplary Embodiment 1 except for these weights. Similarly, a dispersion 10 of the conductive material is obtained by changing the weight of the SWNT from 10 mg to 65 mg, and the weight of PVdF(HFP) from 80 mg to 100 mg, by producing the dispersion on the same conditions as in Exemplary Embodiment 1 except for these weights.

The actuator in which the pair of the electrode layers of which the void fraction decreases in the direction from the moving part to the stationary part sandwiches the ionic conduction layer is produced as follows, by using the dispersions 7 to 10 of the conductive material obtained in the above description and the dispersion 5 of the conductive material obtained in Exemplary Embodiment 1. Firstly, the ionic conduction layer is obtained by pouring the ionic composition 1 including PVdF(HFP)/BMIBF$_4$/DMAc obtained in Exemplary Embodiment 1 onto a substrate provided with a spacer with a thickness of 100 µm, flattening the ionic composition while using the spacer as a guide and drying the composition at room temperature.

Next, a coating layer was produced by sequentially applying the dispersion 7 of the conductive material, the dispersion 8 of the conductive material, the dispersion 9 of the conductive material, the dispersion 10 of the conductive material and the dispersion 5 of the conductive material onto the substrate at spaces of 2 mm and using a film applicator provided with a micrometer to adjust a gap between the applicator and the substrate to 100 µm. One electrode layer is obtained by drying the coating layer at room temperature, and the other electrode layer is obtained on the same conditions.

Next, a pair of electrode layers are stacked so as to sandwich the ionic conduction layer similar to that obtained in Exemplary Embodiment 1 so that the order of the applied dispersions 7, 8, 9, 10 and 5 of the conductive material matches in the same direction, and the actuator is obtained by pressure and heat fusion-bonding the assembly at 100° C. and 0.5 kN with the use of a hot press. It is confirmed that the pair of the electrode layers sandwiches the ionic conduction layer, by observing the cross section of the obtained actuator with SEM.

Comparative Example 5

An actuator is produced, in which a pair of electrode layers of which the void fraction is consistent in the direction from the moving part to the stationary part sandwiches the ionic conduction layer. The actuator is produced by forming an electrode layer by using only the dispersion 7 of the conductive material obtained in Exemplary Embodiment 3 on the same conditions as in Exemplary Embodiment 3 except for the dispersion. It is confirmed that the pair of the electrode layers sandwiches the ionic conduction layer, by observing the cross section of the obtained actuator with SEM.

(Evaluation of Void Fraction)

The void fraction is obtained by the above described expression (1). The results of Exemplary Embodiment 3 and Comparative Examples 5 and 2 are shown in Table 3.

TABLE 3

| | Exemplary Embodiment 3 | Comparative Example 5 | Comparative Example 2 |
|---|---|---|---|
| Content (A) (mm$^2$) | 0.004/0.006/0.009/0.012/0.015 | Each one 0.004 | Each one 0.015 |
| Layer thickness (μm) | Each one 50 | Each one 50 | Each one 50 |
| void fraction (vol %) | 48.0/42.3/36.5/30.6/24.6 | Each one 50 | Each one 50 |
| Generating force (N) in the vicinity of stationary part | 0.023 | 0.006 | 0.025 |
| Displacement (mm) in moving part | 5.4 | 2.5 | 1.0 |

The numerical values in each item of Exemplary Embodiment 3 in Table 3 are shown in order of the direction from the moving part (content: 0.004, and void fraction: 48.0) to the stationary part (content: 0.015, and void fraction: 24.6) respectively. A generating force in the vicinity of the stationary part and displacement in the moving part have been measured by fixing the end including a smaller void fraction of the electrode layer by the stationary part provided with electrodes.

When the cross sections of the arbitrary parts of the actuator in Exemplary Embodiment 3 are observed, the void fraction increases step by step or continuously in the direction from the moving part to the stationary part. In addition, a portion exerted by the moving part was arranged at the position of 8 mm apart from the stationary part end of the actuator, and an ON/OFF operation was repeated 12,000 times at 0.1 Hz while a voltage of 2.5 V was applied to the actuators obtained in Exemplary Embodiment 3 and the Comparative Examples 5 and 2. As a result, a crack/rupture and the like have not been observed in the actuators of Exemplary Embodiment 3 and the Comparative Example 2. On the other hand, a crack/rupture and the like were partially observed in the vicinity of the stationary part in the actuator of Comparative Example 5.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-197414, filed Aug. 27, 2009, which is hereby incorporated by reference herein in its entirety.

What is claimed is:

1. An actuator comprising a pair of first electrode layers which contain a conductive material, an ionic conduction layer which is sandwiched between the pair of the first electrode layers, and a pair of second electrodes for applying voltage between the pair of the first electrode layers, wherein a content of the conductive material contained in the first electrode layer is larger in a stationary part of the actuator than in a moving part of the actuator, the first electrode layer being connected to the second electrode at the stationary part.

2. The actuator according to claim 1, wherein the content of the conductive material contained in the electrode layer increases toward the stationary part of the actuator from the moving part.

3. An actuator comprising a pair of electrode layers which contain a conductive material and an ionic conduction layer which is sandwiched between the pair of the electrode layers, wherein a thickness of the electrode layer is larger in a stationary part of the actuator than in a moving part of the actuator, and
wherein the thickness of the electrode layer increases toward the stationary part of the actuator from the moving part.

4. An actuator comprising a pair of electrode layers which contain a conductive material and an ionic conduction layer which is sandwiched between the pair of the electrode layers, wherein a void fraction of the electrode layer is smaller in a stationary part of the actuator than in a moving part of the actuator.

5. The actuator according to claim 4, wherein the void fraction of the electrode layer decreases toward the stationary part of the actuator from the moving part.

6. The actuator according to claim 1, wherein the ionic conduction layer contains an ionic liquid.

7. The actuator according to claim 1, wherein the conductive material comprises a carbon material.

8. The actuator according to claim 3, wherein the ionic conduction layer contains an ionic liquid.

9. The actuator according to claim 3, wherein the conductive material comprises a carbon material.

10. The actuator according to claim 4, wherein the ionic conduction layer contains an ionic liquid.

11. The actuator according to claim 4, wherein the conductive material comprises a carbon material.

* * * * *